United States Patent
Peer et al.

(10) Patent No.: US 8,690,159 B2
(45) Date of Patent: Apr. 8, 2014

(54) SPIRAL WOUND BOUND SEAL

(75) Inventors: David J. Peer, Olean, NY (US); Robert E. Kunselman, Olean, NY (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 13/381,560

(22) PCT Filed: Jun. 23, 2010

(86) PCT No.: PCT/US2010/039575
§ 371 (c)(1),
(2), (4) Date: Jan. 13, 2012

(87) PCT Pub. No.: WO2011/008440
PCT Pub. Date: Jan. 20, 2011

(65) Prior Publication Data
US 2012/0104700 A1    May 3, 2012

Related U.S. Application Data

(60) Provisional application No. 61/225,488, filed on Jul. 14, 2009.

(51) Int. Cl.
*F01D 11/02* (2006.01)

(52) U.S. Cl.
USPC ........................................... 277/355

(58) Field of Classification Search
CPC .................................. F16J 15/3288
USPC ........................................... 277/355
See application file for complete search history.

(56) References Cited

U.S. PATENT DOCUMENTS

| | | | |
|---|---|---|---|
| 3,559,515 A * | 2/1971 | Kyser | 81/427 |
| 5,142,776 A | 9/1992 | Neely | |
| 5,181,728 A | 1/1993 | Stec | |
| 5,597,167 A * | 1/1997 | Snyder et al. | 277/355 |
| 6,296,417 B1 | 10/2001 | Kinnersly | |
| 7,052,234 B2 * | 5/2006 | Wells et al. | 415/137 |
| 7,140,840 B2 * | 11/2006 | Taillant et al. | 415/191 |
| 2003/0062685 A1 * | 4/2003 | Inoue | 277/355 |
| 2004/0217549 A1 | 11/2004 | Justak | |
| 2007/0063448 A1 * | 3/2007 | Kowalczyk | 277/355 |
| 2007/0074610 A1 * | 4/2007 | Heinsohn | 81/302 |
| 2007/0252336 A1 * | 11/2007 | Grabeldinger | 277/355 |
| 2008/0290604 A1 | 11/2008 | Lusted et al. | |

OTHER PUBLICATIONS

International Search Report and Written Opinion (42495.617) dated Sep. 13, 2010 (9 pages).

* cited by examiner

*Primary Examiner* — Vishal Patel
*Assistant Examiner* — Nathan Cumar
(74) *Attorney, Agent, or Firm* — Edmonds & Nolte, PC

(57) ABSTRACT

A brush seal is disclosed that may include a spring-loaded seal arrangement configured to conform to a wide range of sealing diameters along the length of a rotor of a turbomachine. In particular, the brush seal may be manufactured with free ends configured to overlap and provide a finite amount of radially expandable/contractible play and yet maintain an effective seal. Consequently, the same brush seal design may be used in a range of locations along a rotor length without the need to specifically manufacture separate brush seals for each variance in dimension.

20 Claims, 2 Drawing Sheets

SPIRAL WOUND BOUND SEAL

The present application is a national stage application of PCT patent application No. PCT/US2010/039575, filed Jun. 23, 2010, which claims priority to U.S. Patent Application Ser. No. 61/225,488, which was filed Jul. 14, 2009. These priority application are hereby incorporated by reference in their entirety into the present application, to the extent that it is not inconsistent with the present application.

The use of brush seals in turbo machinery is well known. In typical operation, brush seals are used to minimize leakage of fluids at circumferential gaps, such as between a machine housing and a rotor, or between any other two circular spaces having different fluid pressures within the turbo machine. In some applications, brush seals are mounted in grooves machined into the housing, or stator, that concentrically surrounds the rotor. The plurality of compliant bristles are generally designed to fit closely together and extend to the outer surface of the rotor, but may also end shortly before. The bristles may also be arranged at an angle to the radius of the rotor. Because of their elasticity and their angular position relative to the rotor, brush seal bristles have the added benefit of being able to bend to compensate for eccentricities of the rotor, especially compensating for rotor imbalance during the time required for the rotor to reach operating speed.

For each location along the rotor where they are desired, brush seals are required to be manufactured at very close tolerances in order to obtain an effective seal without also causing heavy wear on the rotor. Moreover, the seals must be finished to a high order of circularity and mounted precisely concentric with the rotor. As a result, brush seals are fairly expensive to manufacture and install. Further, because of the varying diameters along a rotor, several distinct brush seals with varying dimensions are required to be manufactured for use in one turbo machine. This practice can prove to be a costly and time-consuming process. Therefore, what is needed is a brush seal configured to adjust to a wide spectrum of diameters, but still maintain an adequate seal for each diameter.

Embodiments of the disclosure may provide a brush seal for sealing a gap between a stator and a rotor. The brush seal may include an annular carrier having a first open end, a second open end, and a substantially uniform finish diameter. An overlapping region may be formed by the first and second open ends, wherein the overlapping region provides the brush seal with a finite amount of radially expandable or contractible play. Finally, a plurality of bristles may project inwardly from the annular carrier and be securedly positioned, or held fast, at least partially therein.

Embodiments of the disclosure may further provide a method of sealing a gap between a stator and a rotating component. The method may include providing an annular carrier having a plurality of bristles that project inwardly therefrom which are configured to make contact with the rotating component, wherein the annular carrier has first and second open ends forming an overlapping region and defining first and second entry points, respectively. The annular carrier may further have a substantially uniform finish diameter. The method also includes receiving a device into the first and second entry points that is capable of adjusting the overlapping region. Also, contracting the substantially uniform finish diameter of the annular carrier using the device, and inserting the annular carrier into a groove located on the stator, wherein the groove has a finish diameter smaller than the substantially uniform finish diameter of the annular carrier, and compressive forces maintain the annular carrier firmly in the groove.

Embodiments of the disclosure may further provide a spring-loaded seal arrangement for sealing a gap between a stator and a rotor. The seal arrangement may include an annular carrier having a first open end, a second open end, and a substantially uniform finish diameter, wherein a plurality of bristles project inwardly from the annular carrier and are held fast at least partially therein. The seal may also include first and second entry points defined on the first and second open ends, respectively, and an overlapping region formed by the first and second open ends and configured to provide the annular carrier with a finite amount of radially expandable or contractible play. The annular carrier is disposed in a machined groove defined in the stator, wherein the machined groove has a finish diameter smaller than the substantially uniform finish diameter of the annular carrier, thereby allowing compressive forces present in the annular carrier to maintain the brush seal firmly in the machined groove.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

Figure 1:
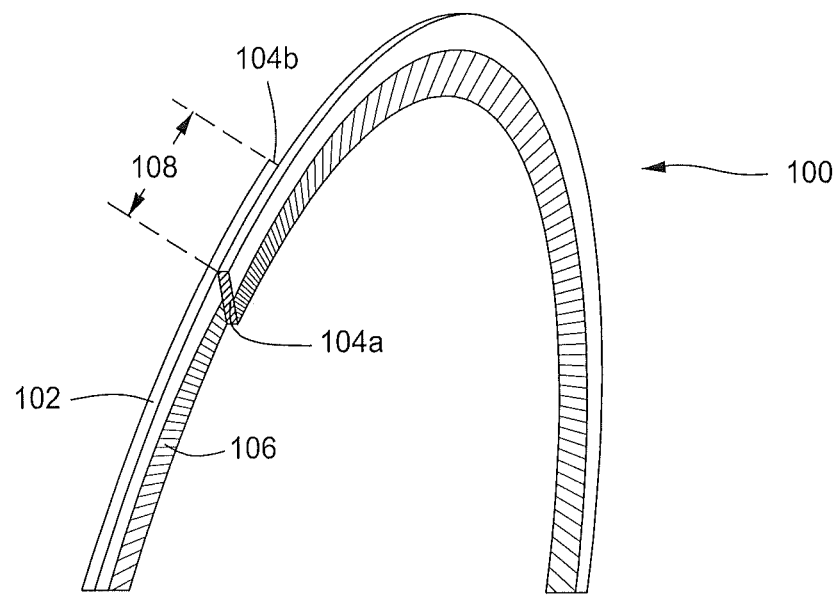
FIG. 1 illustrates an isometric view of a portion of an exemplary brush seal according to at least one embodiment of the present disclosure.

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope.

According to the several exemplary embodiments discussed below, a brush seal is disclosed that may include a spring-loaded seal arrangement configured to conform to a wide range of sealing diameters along the length of a rotor of a turbomachine. In particular, the brush seal may be manufactured as a type of snap ring or circlip that may be inserted into any number of grooves machined into a stator or housing, wherein the free ends of the brush seal may be configured to overlap so that the seal may properly fit at varying circumferences along the rotor and yet maintain an effective seal. Consequently, the same brush seal design may be used in a range of locations along a rotor length without the need to specifically manufacture separate brush seals for each variance in dimension.

FIG. 1 illustrates a portion of an exemplary brush seal 100 according to at least one embodiment of the present disclosure. The brush seal 100 may include an annular carrier 102 configured to receive a plurality of compliant bristles 106 projecting generally inward from the annular carrier 102, wherein the bristles 106 are held at least partially within the annular carrier 102. The bristles 106 may be seated and held fast, or securely positioned, in their required disposition by several means including welding, brazing or otherwise securing the ends of the bristles 106 to the annular carrier 102. Alternatively, the bristles 106 may be fused together, for instance, by soldering, brazing or by some other suitable non-metallic medium, depending upon the nature of the bristles 106 themselves, and then subsequently clamped into the annular carrier 102.

In an exemplary embodiment, the bristles 106 may be made from metallic or non-metallic fibers. For example, the bristles 106 may include fibers made from cobalt or a nickel-based high-temperature superalloy wire suitable for elevated temperature operation. Moreover, non-metallic bristles 106 can include fibers made from ceramic or polymeric materials.

The annular carrier 102 may be fashioned similar to that of a circlip or a snap ring as is known in the art, wherein a semi-flexible metal ring includes open ends 104a, 104b that extend over one another to create an overlapping region 108. The overlapping region 108 may function primarily to increase sealing efficiency, as described in more detail below. In at least one embodiment, the annular carrier 102 may be a spiral-wound ring manufactured from spring steel which provides the necessary flexibility to deform the carrier 102 so that it may be manipulated into and out of a machined groove, as will be explained below. Alternatively, the annular carrier 102 may be manufactured of any material exhibiting similar elasticity and capable of handling the pressure differentials and temperatures incident in typical applications.

In an exemplary embodiment, the overlapping region 108 may provide the brush seal 100 a finite amount of radially expandable or contractible play and yet maintain an effective seal. For example, the length of the overlapping region 108 between the open ends 104a, 104b may allow for a circumference variance of about 1.00 in., wherein any decrease in the length will proportionally increase the overall circumference of the annular carrier 102. Likewise, any increase in the length will proportionally decrease the overall circumference of the annular carrier 102. Therefore, as can be appreciated, a singular-sized brush seal 100 may be capable of expanding or contracting the length of the overlapping region 108 to fit a wide range of specific diameters. Not only does this help to reduce overall brush seal 100 inventory, but there is inherently a reduced need to design and manufacture numerous different brush seals for similar applications in which seal dimensions vary slightly.

Figure 2:
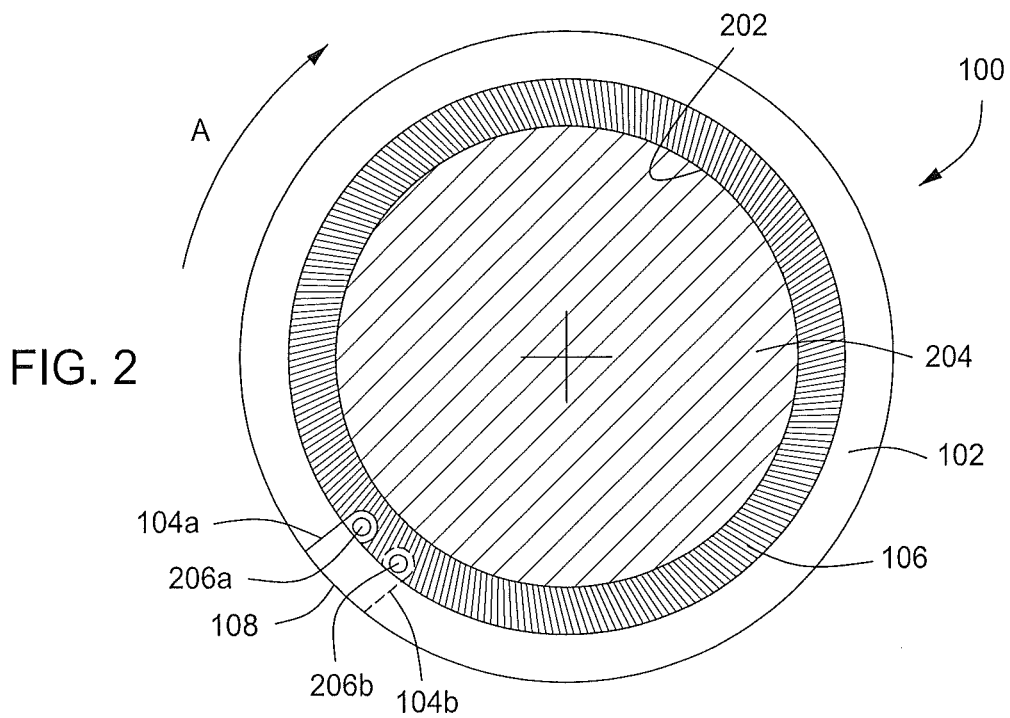
FIG. 2 illustrates a side view of a brush seal according to at least one embodiment of the present disclosure.

Referring now to FIG. 2, an exemplary brush seal 100 is illustrated, according to at least one embodiment of the present disclosure. The bristles 106 projecting inwardly out of the annular carrier 102 may be configured to extend and make contact with a sealing surface 202. In an exemplary embodiment, the sealing surface 202 may include the radial outside surface of a rotor 204 located in a turbo machine, such as a centrifugal compressor. In an alternative embodiment, the bristles 106 may be configured to extend toward the sealing surface 202, but stop short of the surface 202, thus providing a small gap between the bristles 106 and the rotor 204. The gap, and/or the overall elasticity of the bristles 106 when in contact with the rotor 204, may compensate for general eccentricities of the rotor 204, such as rotor 204 imbalances manifested during the time required for the rotor 204 to reach operating speeds.

As illustrated in FIG. 2, the bristles 106 may be mounted diagonally relative to the radius of the carrier 102 and angled so as to follow the direction of rotation for the rotor 204, as indicated in the direction marked A. In other words, the bristles 106 may be so angled so that the free ends point in the same direction as the movement of the rotor 204. In one embodiment, the angle of the bristles 106 may be about a 45 degree angle relative to the sealing surface 202. Ideally, the rotor 204 may still be rotated in the opposite direction of direction A, but if done at high speeds and for a long period of time, the sealing effect may be reduced and result in excessive wear on the brush seal 100 and/or the rotor 204.

In an exemplary embodiment, the radial height of the annular carrier 102 may be about 0.5 in. to about 0.75 in. The axial thickness of the annular carrier 102 may be about 0.09 in., or alternatively sufficient thickness to accommodate the number of bristles 106 needed for the particular application. The free ends of the bristles 106 projecting inwardly from the annular carrier 102 may have a radial height of about 0.5 in. to about 0.75 in. It is to be understood that the foregoing measurements are entirely dependent on the specific application and the spring force required to maintain the brush seal 100 properly seated in a machined groove, as explained below. Therefore, the present disclosure further contemplates several other variations in dimensions so as to adequately embrace all foreseen turbo machine applications.

Still referring to FIG. 2, the exemplary brush seal 100 may further include entry points 206a, 206b coupled to open ends 104a, 104b, respectively, wherein open end 104b is seated axially behind open end 104a, thus creating the overlapping region 108. For illustrative purposes, the entry point 206b is shown at the forefront in FIG. 2, but it is to be understood that it may alternatively be axially offset from entry point 206a, thereby being located behind the bristles 106.

In exemplary operation of the brush seal 100, the entry points 206a, 206b may serve to adjust the length of the overlapping region 108, thereby varying the overall circumference of the annular carrier 102. Once the overall circumference of the annular carrier 102 is adjusted, the brush seal 100 may be inserted into and/or removed from a machined groove. For example, the entry points 206a, 206b may be configured to receive a pair of needle-nosed pliers, or a similar device, to manipulate the finite amount of radially expandable/contractible play in the brush seal 100, as explained above. In at least one embodiment the entry points 206a, 206b may receive and be separated by a pair of circlip pliers. By circumferentially separating the entry points 206a, 206b, or increasing the length of the overlapping region 108, the overall circumference of the annular carrier 102 is thereby decreased. Likewise, by circumferentially forcing the entry points 206a, 206b closer together, or decreasing the length of the overlapping region 108, the overall circumference of the annular carrier 102 is thereby increased. As can be appreciated, any means of expanding or contracting the overall circumference of the brush seal 100 is within the scope of the present disclosure. This may include hydraulic, pneumatic, mechanical, electrical, and even manual means.

Figure 3:
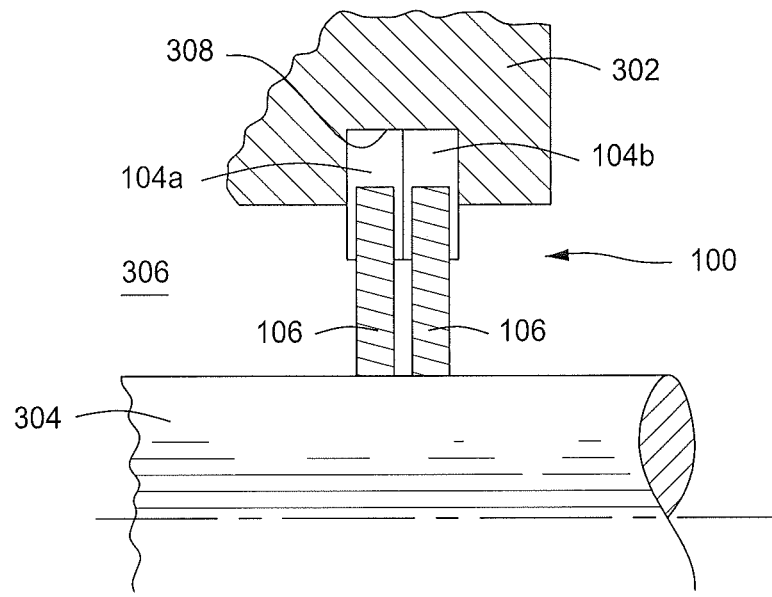
FIG. 3 illustrates a side view of an exemplary brush seal installed according to at least one embodiment of the present disclosure.

Referring now to FIG. 3, an exemplary brush seal 100 is installed according to at least one embodiment of the present disclosure. In exemplary operation, the brush seal 100 may be configured to seal two areas of differing pressures between a stator 302 and a rotor 304, wherein the rotor 304 extends through a bore 306 defined in the stator 302. The brush seal 100 may be mounted in the stator 302, for example, in a machined groove 308 that is radially offset but coaxial with the bore 306. As illustrated, the machined groove 308 may be configured to accommodate the axial thickness of the combination of both open ends 104a, 104b of the annular carrier 102 where the overlapping region 108 is formed (see FIGS. 1 and 2).

To install the exemplary brush seal 100 into the machined groove 103, the circumference of the annular carrier 102 must be contracted (see FIG. 2). As explained above with reference to FIG. 2, a pair of needle-nosed pliers, or similar device, may be used to apply a separating force to the entry points 206a, 206b, thereby causing them to circumferentially separate and decrease the overall circumference of the annular carrier 102. Once positioned at the location of the desired machined groove 308, the separating force applied at the entry points 206a, 206b may then be released whereby the spring-force elasticity of the annular carrier 102 may bias the annular carrier 102 and provide an interference fit into the machined groove 308. Removal of the brush seal 100 would follow the reverse of the preceding steps.

As further explanation, the brush seal 100 may be manufactured to a specific free diameter. In operation, the brush seal 100 may be inserted into a machined groove 308 having an outside diameter that is smaller than the free diameter of the brush seal 100. Thus, the expansive forces inherent in the arrangement of the brush seal 100 when placed in the machined groove 308 hold the seal firmly in the groove 308 and simultaneously maintain its radial height and finish diameter. Alternatively, the brush seal 100 may further be held into place by means of toe clamps (not shown) which act as a shoulder located on the stator 302 and prevent movement in the axial direction.

Once placed in the machined groove 308, the bristles 106 may be configured to extend and make slight contact with or wipe against the rotor 304 as it rotates, effectively sealing off the bifurcated areas. in alternative embodiments, a very small gap may exist between the free ends of the bristles 106 and the rotor 304, such as a 0.001 in. radial gap. However, depending on the specific application and the various pressures encountered, the radial gap may be more or less than 0.001 in. In at least one embodiment, the brush seal 100 may be configured to effectively seal pressure differentials of up to 100 psi. As can be appreciated, however, by changing the bristle 106 material, or altering the number of the bristles 106 and their overall axial thickness, higher pressure differentials may be effectively sealed using the brush seal 100.

Figure 4:
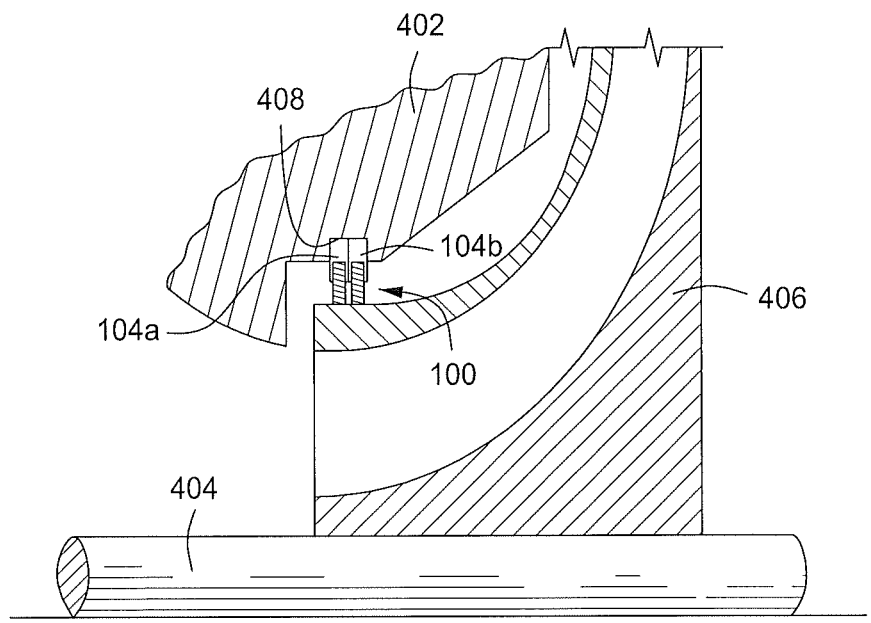
FIG. 4 illustrates a side view of an exemplary brush seal installed according to at least one embodiment of the present disclosure.

Referring now to FIG. 4, an exemplary brush seal 100 according to the present disclosure may also be used as an interstage seal, for example, in a multi-stage turbo-compressor. As illustrated, the brush seal 100 may be configured to seal two areas of differing pressures between a stator 402 and an impeller 406, wherein the impeller 406 may be coupled to a rotor 404. Similar to the embodiments described in FIG. 3 above, the brush seal 100 may be mounted in a machined groove 408 located on the stator 402, and capable of accommodating the axial thickness of both open ends 104a, 104b where the overlapping region 108 is formed (see FIGS. 1 and 2). Removal and insertion of the brush seal 100 as illustrated may be similarly executed as described above.

As known by those skilled in the art, turbo machines generally have several rotor or shaft seal areas along the length of the shaft that are fairly close in dimension, yet different enough to require separate seal arrangements. According to the present disclosure, a singular brush seal may be manufactured to fit a wide range of seal area dimensions along the shaft length, thus reducing the need to manufacture and tolerance a different brush seal for each seal area. The service for the exemplary brush seal, as disclosed herein, may be used in any place where a seal is required and the pressure differential is appropriate for this type of seal. Specifically, the disclosed brush seal may be used an a variety of turbo machines, including compressors, turbines, and their respective test vehicles.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A brush seal for sealing a gap between a stator and a rotor, comprising:
   an annular carrier having a first open end, a second open end, and a circumference;
   an overlapping region formed by the first and second open ends, wherein the annular carrier has a single diameter at least in the overlapping region and the overlapping region provides the brush seal with a finite amount of radially expandable or contractible play; and
   a plurality of bristles projecting inwardly from the annular carrier and held fast at least partially therein.

2. The brush seal of claim 1, wherein the annular carrier is made of spring steel.

3. The brush seal of claim 2, wherein the annular carrier is disposed in a machined groove located on the stator, the machined groove having a diameter smaller than the single diameter of the annular carrier, thereby allowing expansive forces present in the annular carrier to maintain the brush seal firmly in the machined groove.

4. The brush seal of claim 1, wherein the plurality of bristles contact the rotor.

5. The brush seal of claim 1, wherein the plurality of bristles are mounted diagonally relative to the radius of the annular carrier and angled in a rotational direction of the rotor.

6. The brush seal of claim 1, wherein the first and second open ends define first and second entry points, respectively.

7. The brush seal of claim 6, wherein the first and second entry points are configured to receive a device capable of altering the overlapping region, thereby adjusting the circumference of the annular carrier.

8. The brush seal of claim 7, wherein the device comprises a pair of circlip pliers.

9. A method of sealing a gap between a stator and a rotating component, comprising:
providing an annular carrier having a plurality of bristles projecting inwardly therefrom and configured to make contact with the rotating component, wherein
the annular carrier has first and second open ends and a circumference,
the first and second ends form an overlapping region and define first and second entry points, respectively, and
the annular carrier further has a single diameter at least in the overlapping region;
receiving a device into the first and second entry points that is capable of adjusting the overlapping region;
contracting the circumference of the annular carrier using the device; and
inserting the annular carrier into a groove located on the stator, wherein the groove has a diameter smaller than the single diameter of the annular carrier, and compressive forces maintain the annular carrier firmly in the groove.

10. The method of claim 9, wherein the annular carrier is made of spring steel.

11. The method of claim 9, wherein the device comprises a pair of needle-nosed pliers.

12. The method of claim 9, wherein the plurality of bristles are mounted diagonally relative to the radius of the annular carrier and angled in a rotational direction of the rotating component.

13. The method of claim 9, wherein the rotating component is a rotor of a turbo machine.

14. The method of claim 9, wherein the rotating component is an impeller coupled to a rotor of a turbo machine.

15. A spring-loaded seal arrangement for sealing a gap between a stator and a rotor, comprising:
an annular carrier having a first open end, a second open end, and a circumference;
a plurality of bristles projecting inwardly from the annular carrier and held fast at least partially therein;
first and second entry points defined on the first and second open ends, respectively; and
an overlapping region formed by the first and second open ends and configured to provide the annular carrier with a finite amount of radially expandable or contractible play, the annular carrier ring having a single diameter at least in the overlapping region,
wherein the annular carrier is disposed in a machined groove defined in the stator, the machined groove having a diameter smaller than the single diameter of the annular carrier, thereby allowing compressive forces present in the annular carrier to maintain the annular carrier firmly in the machined groove.

16. The seal arrangement of claim 15, wherein the annular carrier is a spiral-wound ring.

17. The seal arrangement of claim 15, wherein the annular carrier is made of spring steel.

18. The seal arrangement of claim 15, wherein the plurality of bristles are mounted diagonally relative to the radius of the annular carrier and angled so as to follow a rotational direction of the rotor.

19. The seal arrangement of claim 15, wherein the first and second entry points are configured to receive a device capable of adjusting the circumference of the annular carrier.

20. The seal arrangement of claim 19, wherein the device comprises a pair of circlip pliers.

* * * * *